US 11,421,553 B2

(12) United States Patent
Davis et al.

(10) Patent No.: US 11,421,553 B2
(45) Date of Patent: Aug. 23, 2022

(54) DUAL RADIAL SCOOP OIL DELIVERY SYSTEM

(71) Applicant: United Technologies Corporation, Farmington, CT (US)

(72) Inventors: Todd A. Davis, Tolland, CT (US); Gianna E. Sabino, Cheshire, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 694 days.

(21) Appl. No.: 16/353,331

(22) Filed: Mar. 14, 2019

(65) Prior Publication Data
US 2020/0291818 A1 Sep. 17, 2020

(51) Int. Cl.
F01D 25/20 (2006.01)
F01M 1/08 (2006.01)
F01M 11/02 (2006.01)
F02C 7/06 (2006.01)

(52) U.S. Cl.
CPC ............. F01D 25/20 (2013.01); F01M 1/08 (2013.01); F01M 11/02 (2013.01); F02C 7/06 (2013.01); F05D 2220/32 (2013.01); F05D 2260/98 (2013.01)

(58) Field of Classification Search
CPC .......... F01D 25/20; F01M 1/08; F01M 11/02; F02C 7/06; F05D 2220/32; F05D 2260/98
See application file for complete search history.

(56) References Cited

U.S. PATENT DOCUMENTS

| 4,648,485 A * | 3/1987 | Kovaleski ............... F01D 25/18 184/13.1 |
| 5,904,427 A * | 5/1999 | Braun ..................... F16C 19/56 384/472 |
| 2003/0039421 A1* | 2/2003 | Fisher ................ F16C 33/6677 384/462 |

(Continued)

FOREIGN PATENT DOCUMENTS

WO 2015102779 A1 7/2015

OTHER PUBLICATIONS

European Search Report for European Application No. 20163000.1 dated Jun. 16, 2020.

Primary Examiner — Michael A Riegelman
(74) Attorney, Agent, or Firm — Carlson, Gaskey & Olds, P.C.

(57) ABSTRACT

A rotating structure provides a first annular array of first radial scoops and a second annular array of second radial scoops arranged axially with respect to the first annular array of first radial scoops. A first component is arranged in an axially forward direction relative to the first annular array of first radial scoops. A second component is arranged in an axially aft direction relative to the second annular array of second radial scoops. A lubrication system includes at least one nozzle aimed at the first and second annular arrays of first and second radial scoops. A first lubrication delivery path fluidly connects the first annular array of first radial scoops to the first component along the axially forward direction. A second lubrication delivery path fluidly connects the second annular array of second radial scoops to the second component along the axially aft direction.

13 Claims, 3 Drawing Sheets

(56) References Cited

U.S. PATENT DOCUMENTS

| | | | |
|---|---|---|---|
| 2011/0198155 A1* | 8/2011 | Charier | F02C 7/06 |
| | | | 184/6.23 |
| 2013/0283758 A1* | 10/2013 | Wotzak | F01D 25/18 |
| | | | 60/39.08 |
| 2016/0319830 A1* | 11/2016 | Sheridan | F04D 29/063 |
| 2016/0348522 A1* | 12/2016 | Labbe | F16C 17/02 |
| 2017/0234222 A1* | 8/2017 | Schwendenmann | F16C 35/073 |
| | | | 184/6.11 |
| 2017/0314418 A1* | 11/2017 | Lighty | F16C 33/1045 |
| 2019/0301466 A1* | 10/2019 | Violet | F16H 57/0486 |
| 2020/0256211 A1* | 8/2020 | Davis | F16N 21/02 |
| 2020/0291818 A1* | 9/2020 | Davis | F01M 11/02 |
| 2021/0040888 A1* | 2/2021 | Coffin | F01D 25/18 |

* cited by examiner

DUAL RADIAL SCOOP OIL DELIVERY SYSTEM

STATEMENT REGARDING FEDERALLY SPONSORED RESEARCH OR DEVELOPMENT

This invention was made with Government support awarded by the United States. The Government has certain rights in this invention.

BACKGROUND

This disclosure relates to a lubrication system for a gas turbine engine.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A common gas turbine engine oil delivery scheme to an engine bearing compartment includes plumbing oil to a strut in the main center body. The oil is delivered through a nozzle supported by the static structure, delivering oil at pressure and speed to various components within the bearing compartment, such as seal plates, oil scoops, bearings, and other components.

Radial oil scoops are used within bearing compartments to deliver oil to critical features, such as bearings or seal runners for cooling and lubrication. However these radial scoops are usually only 50-60% efficient at capturing the delivered oil. One proposed design delivers oil both forward and aft, but these are in low flow applications. In an application that requires higher oil flow (due to higher loads, temperatures, pressures, or speeds), having half the scoop deliver oil forward and half aft would be ineffective.

SUMMARY

In one exemplary embodiment, a gas turbine engine includes an engine static structure. A rotating structure is configured to rotate relative to the engine static structure. The rotating structure provides a first annular array of first radial scoops. The rotating structure provides a second annular array of second radial scoops arranged axially with respect to the first annular array of first radial scoops. A first component is arranged in an axially forward direction relative to the first annular array of first radial scoops. A second component is arranged in an axially aft direction relative to the second annular array of second radial scoops. A lubrication system includes at least one nozzle aimed at the first and second annular arrays of first and second radial scoops. A first lubrication delivery path fluidly connects the first annular array of first radial scoops to the first component along the axially forward direction. A second lubrication delivery path fluidly connects the second annular array of second radial scoops to the second component along the axially aft direction.

In a further embodiment of the above, the rotating structure includes a ring mounted to a shaft. The first annular array of first radial scoops and the second annular array of second radial scoops are provided on the ring.

In a further embodiment of any of the above, a seal is provided radially between the ring and the shaft. The seal fluidly separates the first lubrication deliver path and the second fluid deliver path. The seal is positioned axially between the first annular array of first radial scoops and the second annular array of second radial scoops.

In a further embodiment of any of the above, the ring includes a first flange that extends in the axially forward direction. A second flange extends in the axially aft direction and includes first and second clamping structures respectively abutting the first and second flanges to secure the ring to the shaft.

In a further embodiment of any of the above, each of the first annular array of first radial scoops and the second annular array of second radial scoops includes 4 to 8 scoops.

In a further embodiment of any of the above, each of the first annular array of first radial scoops and the second annular array of second radial scoops includes an arcuate tapered surface leading to a window that is configured to fluidly communicate lubricant from an outer diameter of the ring to an inner diameter of the ring.

In a further embodiment of any of the above, the first radial scoops of the first annular array of first radial scoops and the second radial scoops of the second annular array of second radial scoops are circumferentially aligned with one another.

In a further embodiment of any of the above, the first annular array of first radial scoops are provided by first and second radially outwardly extending walls. The second annular array of second radial scoops are provided by the second radially outward extending wall and a third radially outwardly extending wall.

In a further embodiment of any of the above, the at least one nozzle includes a first nozzle that is axially aligned with the first annular array of first radial scoops. A second nozzle is axially aligned with the second annular array of second radial scoops.

In a further embodiment of any of the above, the gas turbine engine includes a reservoir that is configured to collect the lubricant. A pump is configured to deliver a lubricant from the reservoir to the at least one nozzle.

In a further embodiment of any of the above, at least one of the first and second components is provided by a bearing compartment including a bearing.

In a further embodiment of any of the above, the bearing supports the rotating structure.

In a further embodiment of any of the above, at least one of the first and second components is provided by a wall that is configured to be thermally stressed.

A radial oil scoop for delivering lubrication to components within a gas turbine engine includes a ring including a first annular array of first radial scoops and a second annular array of second radial scoops arranged axially with respect to the first annular array of first radial scoops. Each of the first annular array of first radial scoops and the second annular array of second radial scoops includes an arcuate tapered surface leading to a window that is configured to fluidly communicate lubricant from an outer diameter of the ring to an inner diameter of the ring.

In a further embodiment of any of the above, the ring includes a first flange that extends axially in a forward direction. A second flange extends axially in an aft direction opposite the forward direction.

In a further embodiment of any of the above, each of the first annular array of first radial scoops and the second annular array of second radial scoops includes 4 to 8 scoops.

In a further embodiment of any of the above, the first radial scoops of the first annular array of first radial scoops and the second radial scoops of the second annular array of second radial scoops are circumferentially aligned with one another. The first annular array of first radial scoops are provided by first and second radially outwardly extending walls. The second annular array of second radial scoops are provided by the second radially outward extending wall and a third radially outwardly extending wall.

A method of delivering lubricant to components within a gas turbine engine includes capturing a lubricant with a first annular array of first radial scoops on a rotating structure. The lubricant is captured with a second annular array of second radial scoops on the rotating structure. The lubricant is delivered from the first annular array of first radial scoops to a first component located forward of the first annular array of first radial scoops along a first lubrication path. The lubricant is delivered from the second annular array of second radial scoops to a second component located aft of the second annular array of second radial scoops along a second lubrication path. The first lubrication path is sealed from the second lubrication path during the delivery steps.

In a further embodiment of any of the above, the rotating structure includes a ring mounted to a shaft. The first annular array of first radial scoops and the second annular array of second radial scoops are provided on the ring. A seal is provided between the ring and the shaft. The seal fluidly separates the first lubrication deliver path and the second fluid deliver path. The seal is positioned axially between the first annular array of first radial scoops and the second annular array of second radial scoops.

In a further embodiment of any of the above, each of the first annular array of first radial scoops and the second annular array of second radial scoops includes an arcuate tapered surface leading to a window that is configured to fluidly communicate lubricant from an outer diameter of the ring to an inner diameter of the ring. The capturing steps include spraying the lubricant at the first annular array of first radial scoops and the second annular array of second radial scoops.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
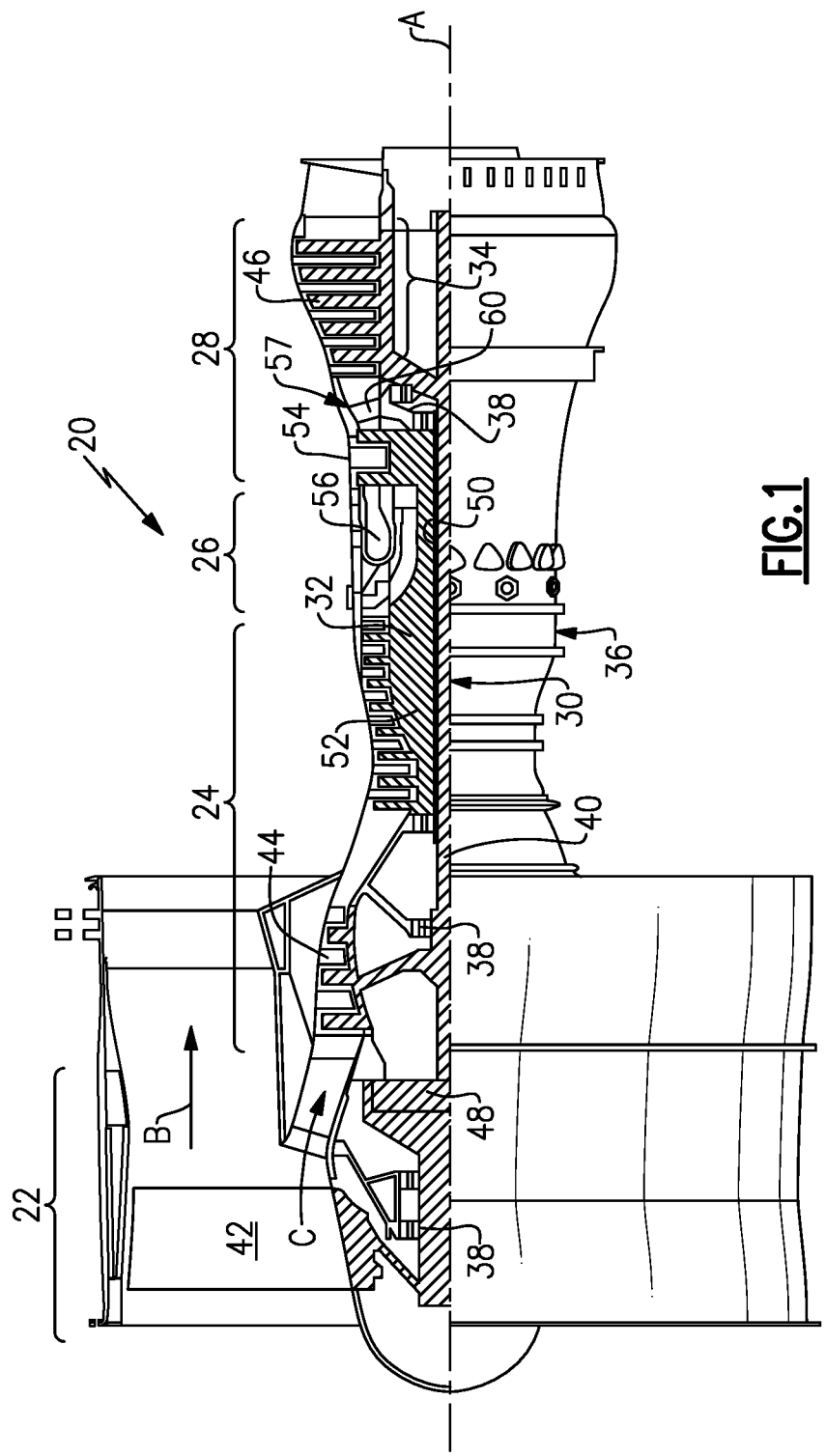
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
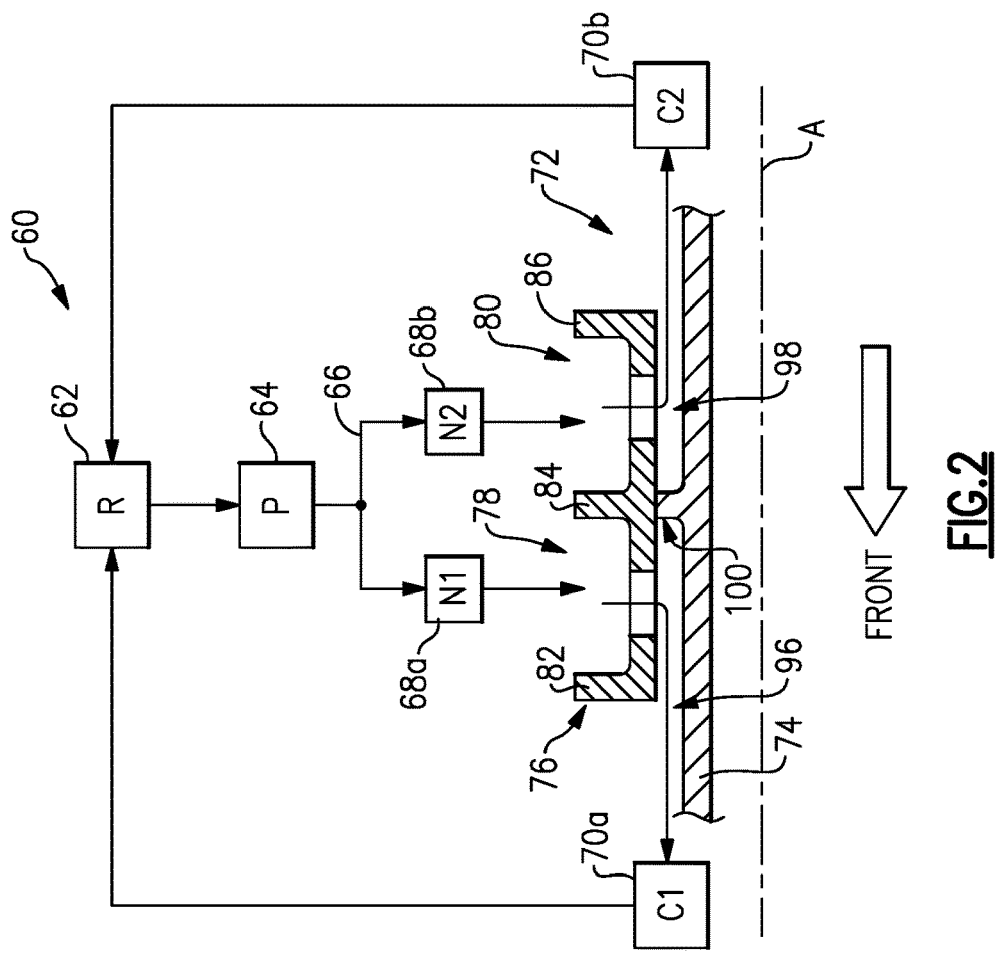
FIG. 2 is a schematic illustration of a lubrication system for the gas turbine engine shown in FIG. 1.

FIG. 2 schematically illustrates an example lubrication system 60 used to deliver a lubricant to various components within the gas turbine engine 20. The system 60 includes a reservoir (R) 62 that collects lubricant, such as oil, from various locations throughout the gas turbine engine 20. A pump (P) 64 supplies oil from the reservoir 62 through lubrication passages 66 to at least one nozzle, for example, first and second nozzles (N1, N2) 68a, 68b. The nozzles direct the lubricant to a rotating structure 72 for circulation, and the lubricant is returned to the reservoir 62 for reuse.

The example rotating structure is used to deliver lubricant to forward and aft first and second components (C1, C2) 70a, 70b. The rotating structure 72 includes a ring 76 mounted to a shaft 74 that rotates about the engine axis A. The ring 76 has scoops that capture the oil from the nozzles. Rather than use one array of radial scoops to distribute the oil, an additional array of radial scoops are used to deliver oil uniformly both forward and aft, without jeopardizing oil flow to any component. This approach maintains the consistent circumferentially flow to the bearing and seals forward and aft of the scoop. Also by separating the flow, the dedicated first and second nozzles 68a, 68b can be smaller, avoiding the use of complicated flow straightening devices for large oil flows. A circumferential array of the first and second nozzles 68a, 68b can be used to more evenly distribute oil to the scoops.

More uniform oil delivery is achieved for cooling and lubrication to the bearing and carbon seal runners, while obtaining improved and less complicated jet flow into the radial scoop. Given height restraints in some compartments, radial scoop can be more effective at directing oil along the underside of the entire seal runner surface.

Figure 3:
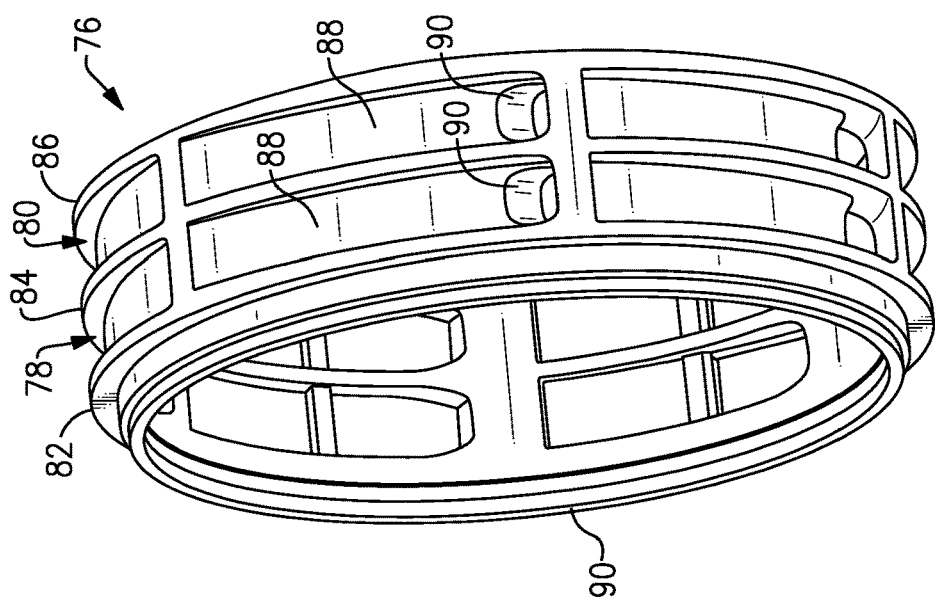
FIG. 3 is a perspective view of a ring of a rotating structure that has first annular array of first radial scoops and second annular array of second radial scoops respectively configured to deliver a lubricant forward and aft.

To this end, referring to FIGS. 2 and 3, the ring 76 includes a first array of first radial scoops 78 and a second array of second radial scoops 80 that is arranged axially with respect to the first array of first radial scoops 78. In the example illustrated in FIGS. 2-4, the first array of first radial scoops 78 is defined by first and second radially extending walls 82, 84. The second array of second radial scoops 80 is provided by the second radial wall 84 and a third radial wall 86, such that the second radial wall 84 is common to both the first and second arrays of first and second radial scoops 78, 80.

The scoops are provided by a series of arcuate tapered surfaces 80 that lead to a window 90 that communicates the lubricant from an outer diameter of the ring 76 to an inner diameter of the ring 76. In the example, each of the first annular array of first radial scoops 78 and the second annual array of second radial scoops 80 includes four to eight scoops. More or fewer scoops may be used if desired. In the example, the windows 90 of the first array of first radial scoops 78 and the second array of second radial scoops 80 are arranged circumferential aligned with and adjacent to one another, which provides improved structural rigidity of the ring 76.

A seal 100 (FIG. 2), or seal 200 (FIG. 4), is provided radially between the ring 76 and the shaft 74. The seal 100 fluidly separates a first lubrication delivery path 96 that extends axially forward to the first component 70a from a second lubrication delivery path 98 that extend axially aft to the second component 70b. In the example illustrated in FIG. 2, the seal 100 is integral with and extends radially outwardly from the shaft 74. In the example illustrated in FIG. 4, the seal 200 is integral with and extends radially inward from the ring 76. The seal 100, 200 is arranged axially between the first array of first radial scoops 78 and the second array of second radial scoops 80.

The first array of first radial scoops 78 and the second array of second radial scoops 80 may be configured to regulate the amount of oil to their fluidly downstream components. For example, the size and/or shape of the windows 90 can be adjusted to restrict or increase oil flow through the scoops.

Figure 4:
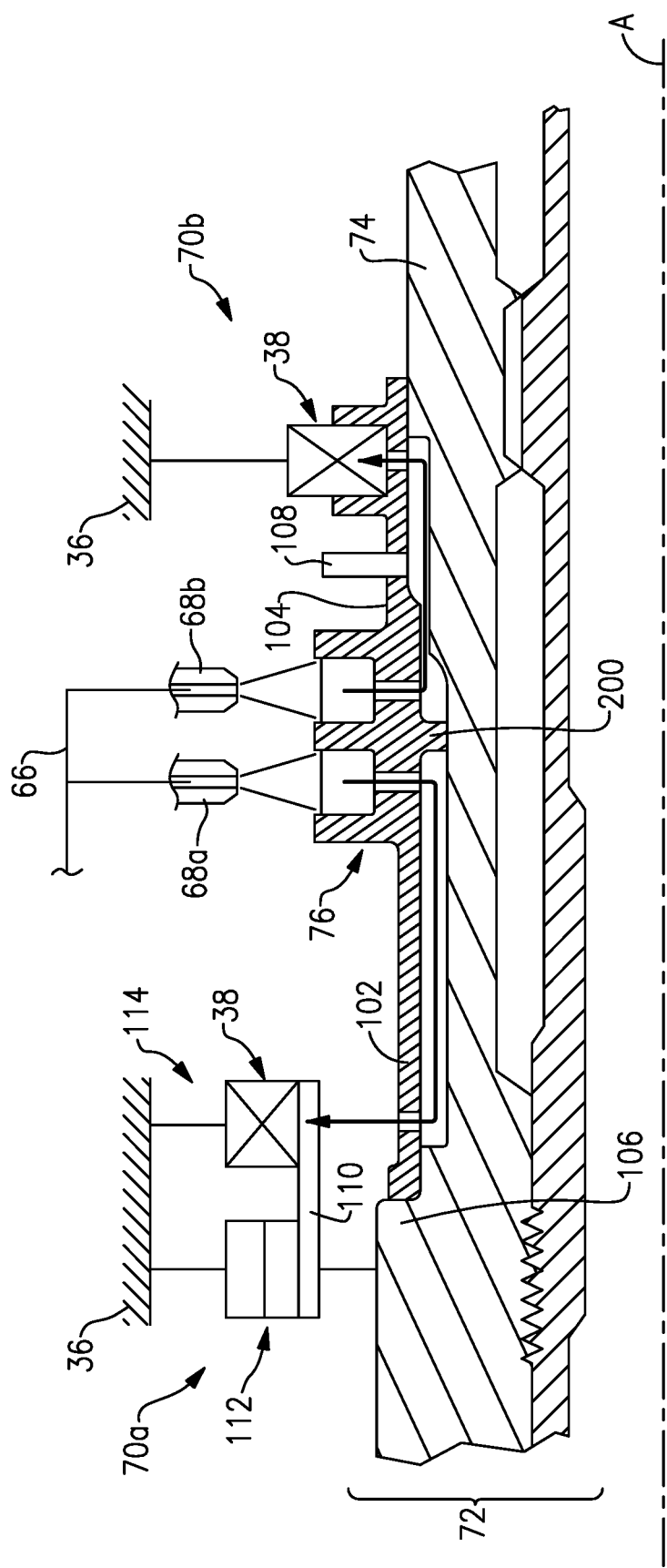
FIG. 4 is a schematic cross-sectional view of the disclosed lubrication system and rotating structure.

In the example illustrated in FIG. 4, the ring 76 includes a first flange 102 extending in an axially forward direction, and a second flange 104 extends in an axially aft direction. First and second clamping structures 106, 108 respectively abut the first and second flanges 102, 104 to securely mount the ring 76 to the shaft 74.

In one example, at least one of the first and second components 70a, 70b is provided by a bearing compartment 114 including a bearing 38. An air seal 112 may also be provided in the bearing compartment 114 to separate the lubricant from adjacent areas within the gas turbine engine 20. A wall 110 (e.g., seal runner) may also provide one of the first and second components 70a, 70b. The wall may be a thermally stressed structure such that lubricant maintains a temperature of the wall 110 below a desired threshold.

In operation, a method of delivering lubricant to components within a gas turbine engine includes capturing the lubricant with the first annular array of first radial scoops 78 on the rotating structure 72, for example, the ring 76. The lubricant is captured with the second annular array of second radial scoops 80 on the ring 76. Lubricant is delivered from the first annular array of first radial scoops 78 to the first component 70a located forward of the first annular array of first radial scoops 78 along a first lubrication path 96. Lubricant is simultaneously delivered from the second annular array of second radial scoops 80 to the second component 70b located aft of the second annular array of second radial scoops 80 along a second lubrication path 98. The first lubrication path 96 is sealed from the second lubrication path 98 during the delivery steps.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the embodiments of the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   an engine static structure;
   a rotating structure configured to rotate relative to the engine static structure, the rotating structure provides a first annular array of first radial scoops, and the rotating structure provides a second annular array of second radial scoops arranged axially with respect to the first annular array of first radial scoops;
   a first component arranged in an axially forward direction relative to the first annular array of first radial scoops, and a second component arranged in an axially aft direction relative to the second annular array of second radial scoops;
   a lubrication system including at least one nozzle aimed at the first and second annular arrays of first and second radial scoops, and a first lubrication delivery path fluidly connecting the first annular array of first radial scoops to the first component along the axially forward direction, and a second lubrication delivery path fluidly connecting the second annular array of second radial scoops to the second component along the axially aft direction; and
   wherein the first annular array of first radial scoops are defined by first and second radially outwardly extending walls, and the second annular array of second radial scoops are defined by the second radially outward extending wall and a third radially outwardly extending wall, the second radially outward extending wall common to both the first and second annular arrays of first and second radial scoops to axially separate the first and second annular arrays of first and second radial scoops from one another.

2. The gas turbine engine of claim 1, wherein the rotating structure includes a ring mounted to a shaft, the first annular array of first radial scoops and the second annular array of second radial scoops are provided on the ring.

3. The gas turbine engine of claim 2, wherein a seal is provided radially between the ring and the shaft, the seal fluidly separating the first lubrication deliver path and the second fluid deliver path, the seal positioned axially between the first annular array of first radial scoops and the second annular array of second radial scoops.

4. The gas turbine engine of claim 2, wherein the ring includes a first flange extending in the axially forward direction, and a second flange extending in the axially aft direction, and comprising first and second clamping structures respectively abutting the first and second flanges to secure the ring to the shaft.

5. The gas turbine engine of claim 2, wherein each of the first annular array of first radial scoops and the second annular array of second radial scoops includes 4 to 8 scoops.

6. The gas turbine engine of claim 5, wherein each of the first annular array of first radial scoops and the second annular array of second radial scoops includes an arcuate tapered surface leading to a window that is configured to fluidly communicate lubricant from an outer diameter of the ring to an inner diameter of the ring.

7. The gas turbine engine of claim 6, wherein the first radial scoops of the first annular array of first radial scoops and the second radial scoops of the second annular array of second radial scoops are circumferentially aligned with one another.

8. The gas turbine engine of claim 1, wherein the at least one nozzle includes a first nozzle is axially aligned with the first annular array of first radial scoops, and a second nozzle is axially aligned with the second annular array of second radial scoops.

9. The gas turbine engine of claim 1, comprising a reservoir configured to collect the lubricant, and a pump configured to deliver a lubricant from the reservoir to the at least one nozzle.

10. The gas turbine engine of claim 1, wherein at least one of the first and second components is provided by a bearing compartment including a bearing.

11. The gas turbine engine of claim 10, wherein the bearing supports the rotating structure.

12. The gas turbine engine of claim 1, wherein at least one of the first and second components is provided by a wall that is configured to be thermally stressed.

13. The gas turbine engine of claim 1, wherein the first, second and third radially outwardly extending walls provide annular pockets discrete from one another, the annular pockets collectively providing the first and second radial scoops.

* * * * *